B. C. STICKNEY.
COMBINED TYPEWRITING AND COMPUTING MACHINE.
APPLICATION FILED NOV. 27, 1916.

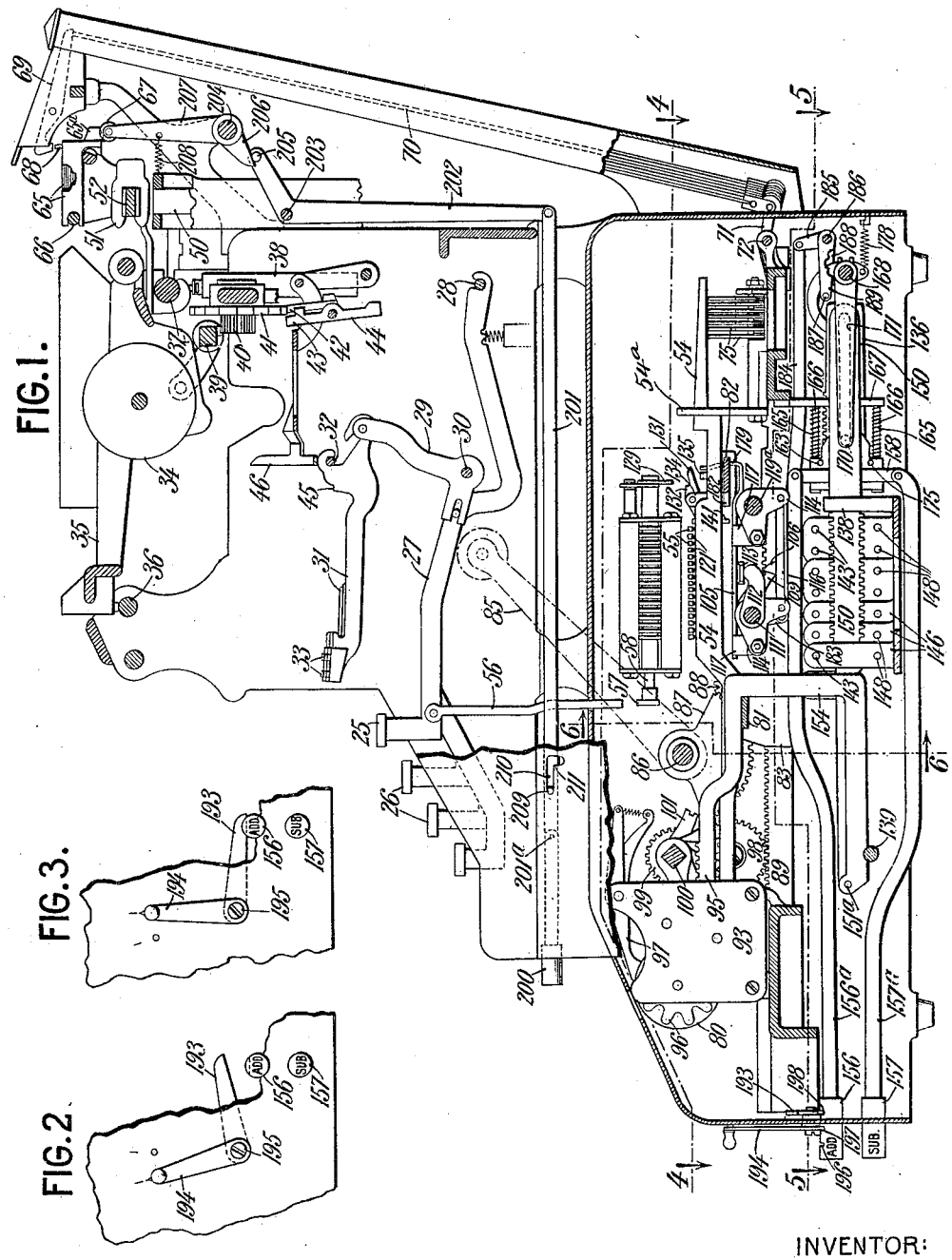

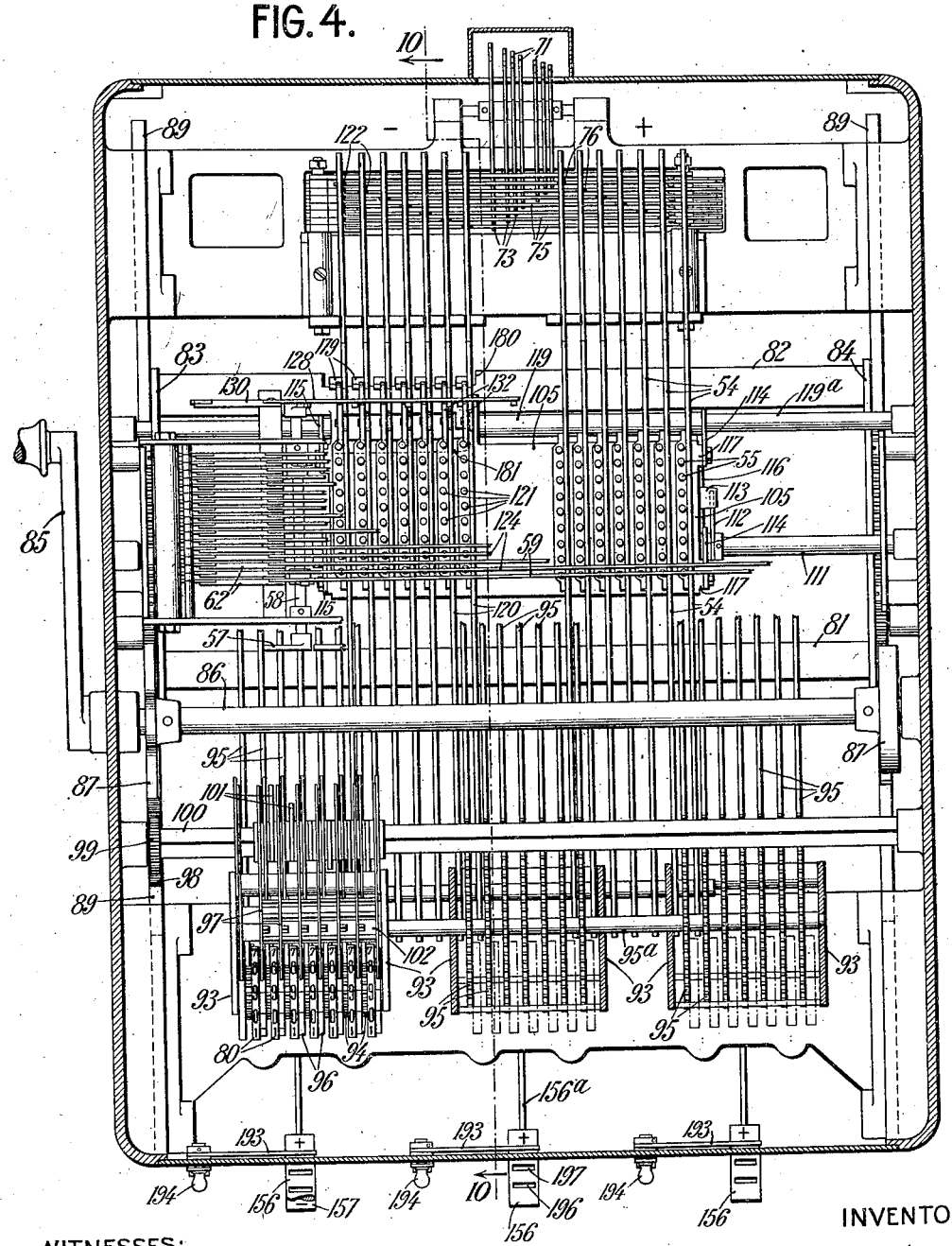

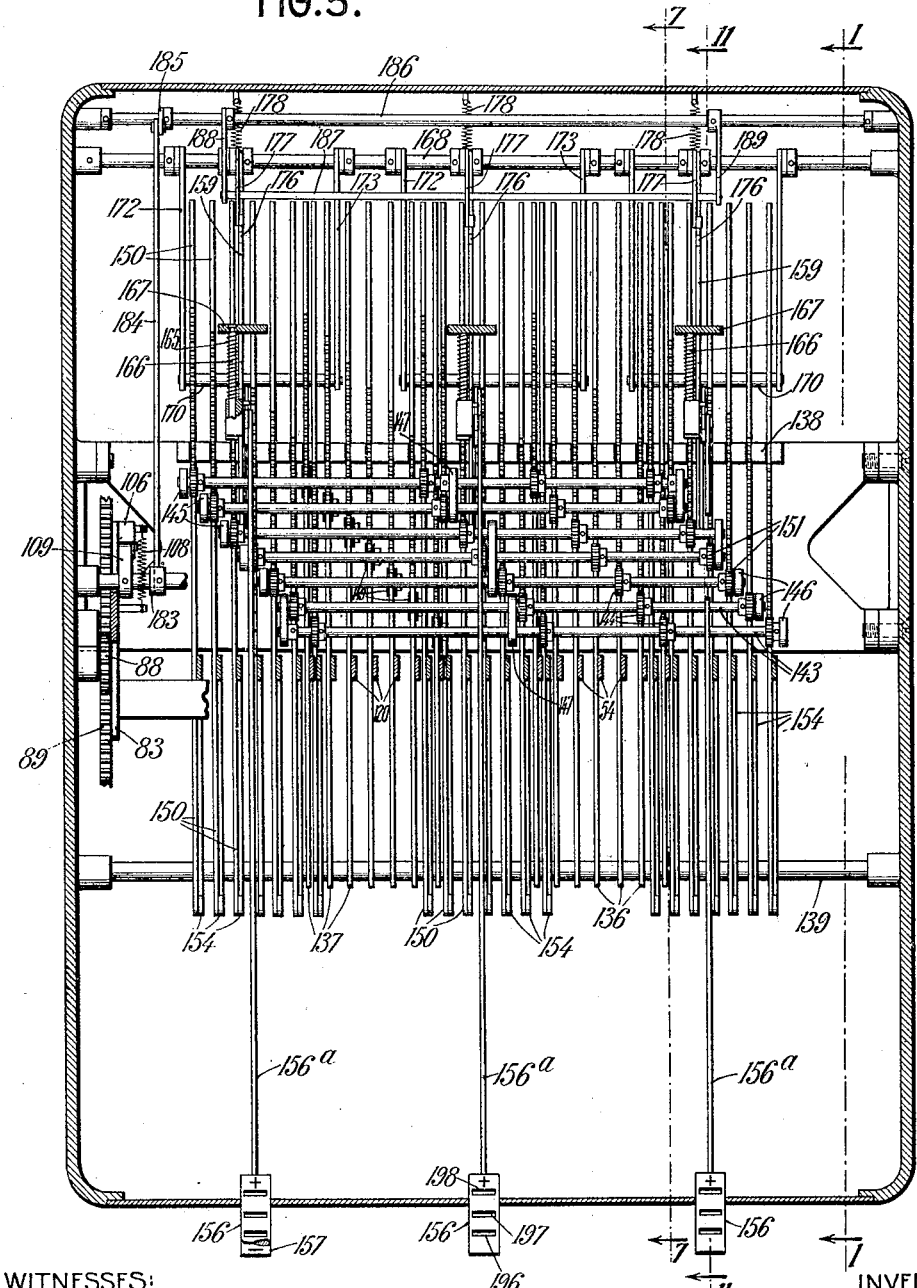

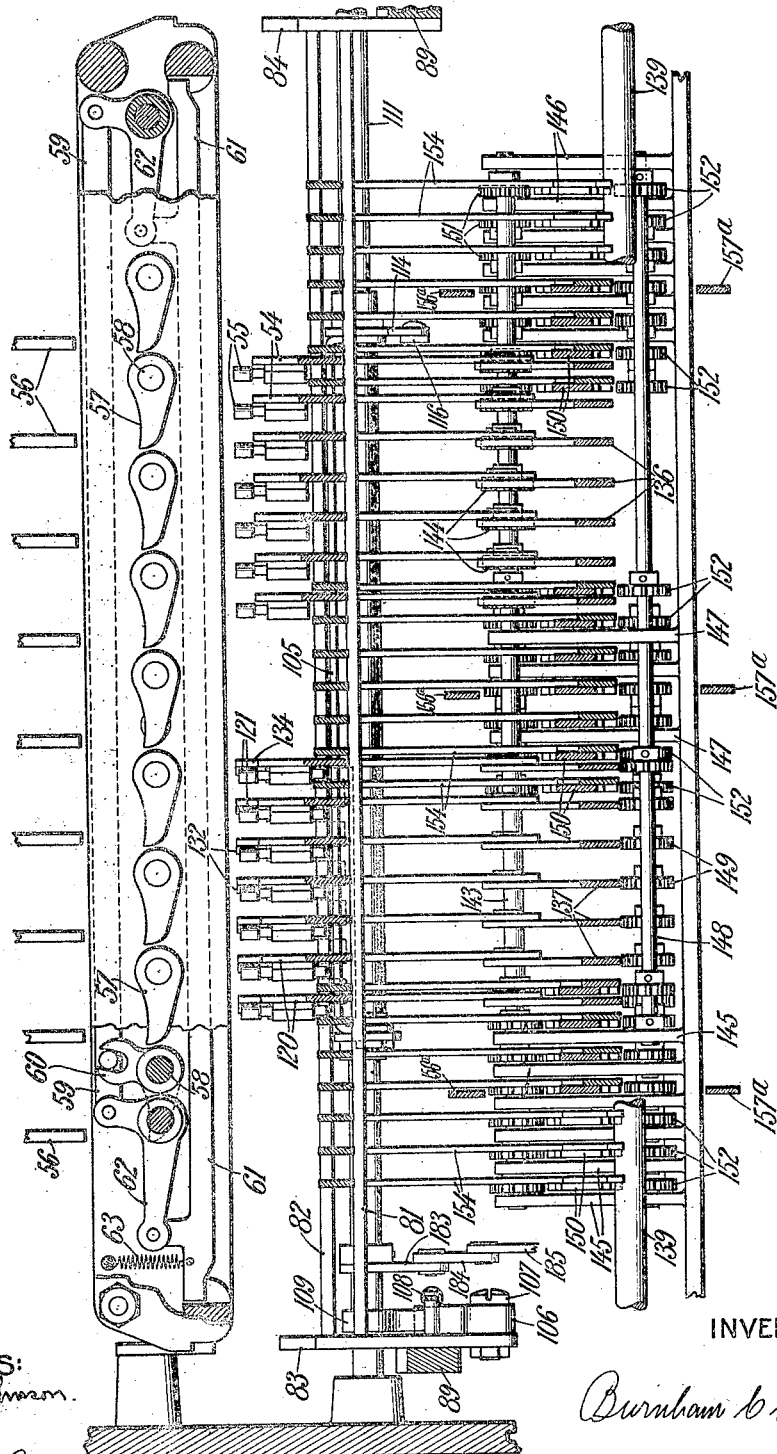

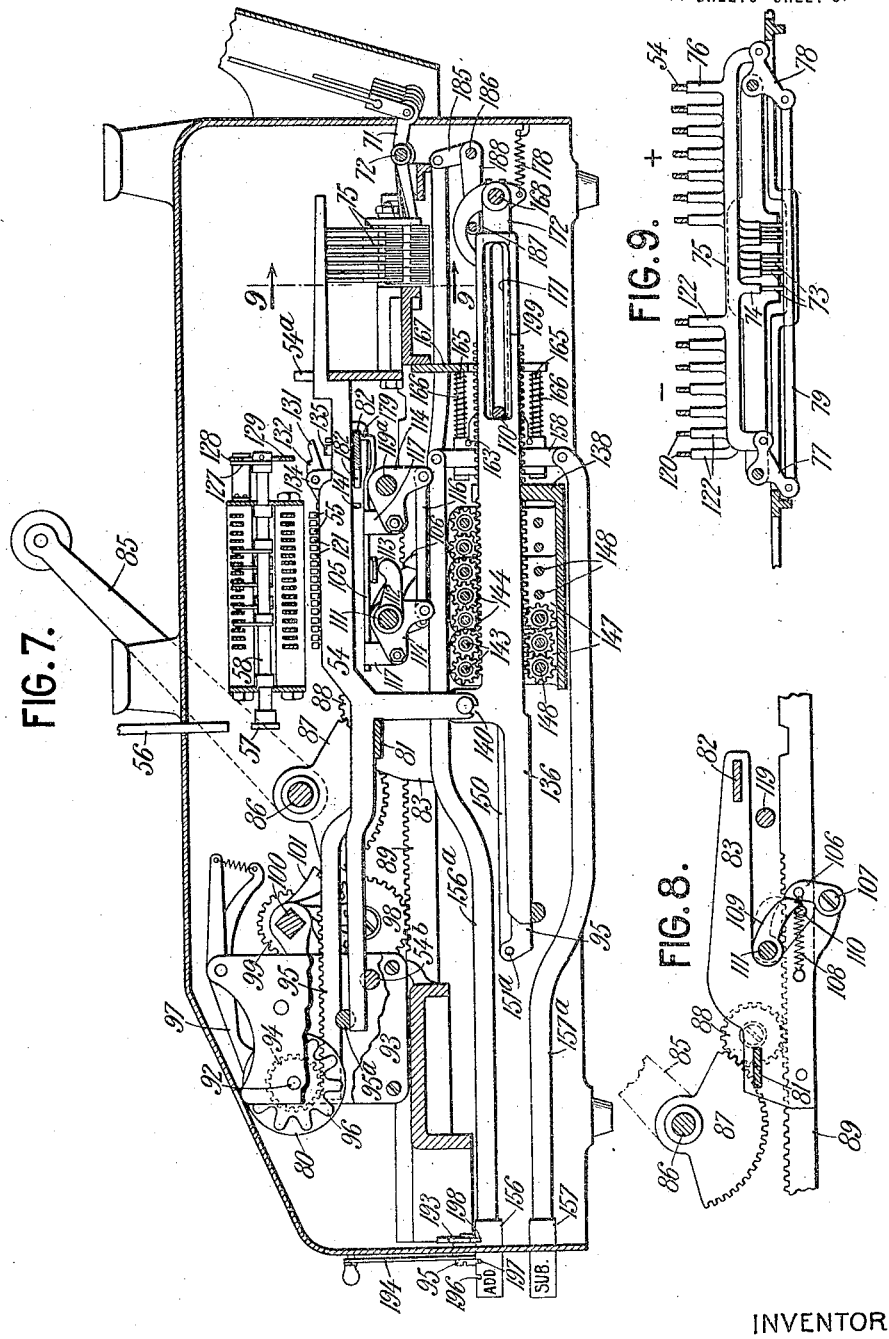

1,369,141.

Patented Feb. 22, 1921.
10 SHEETS—SHEET 6.

WITNESSES:
Arthur A. Johnson
Julius Bluchstine

INVENTOR:
Burnham C. Stickney

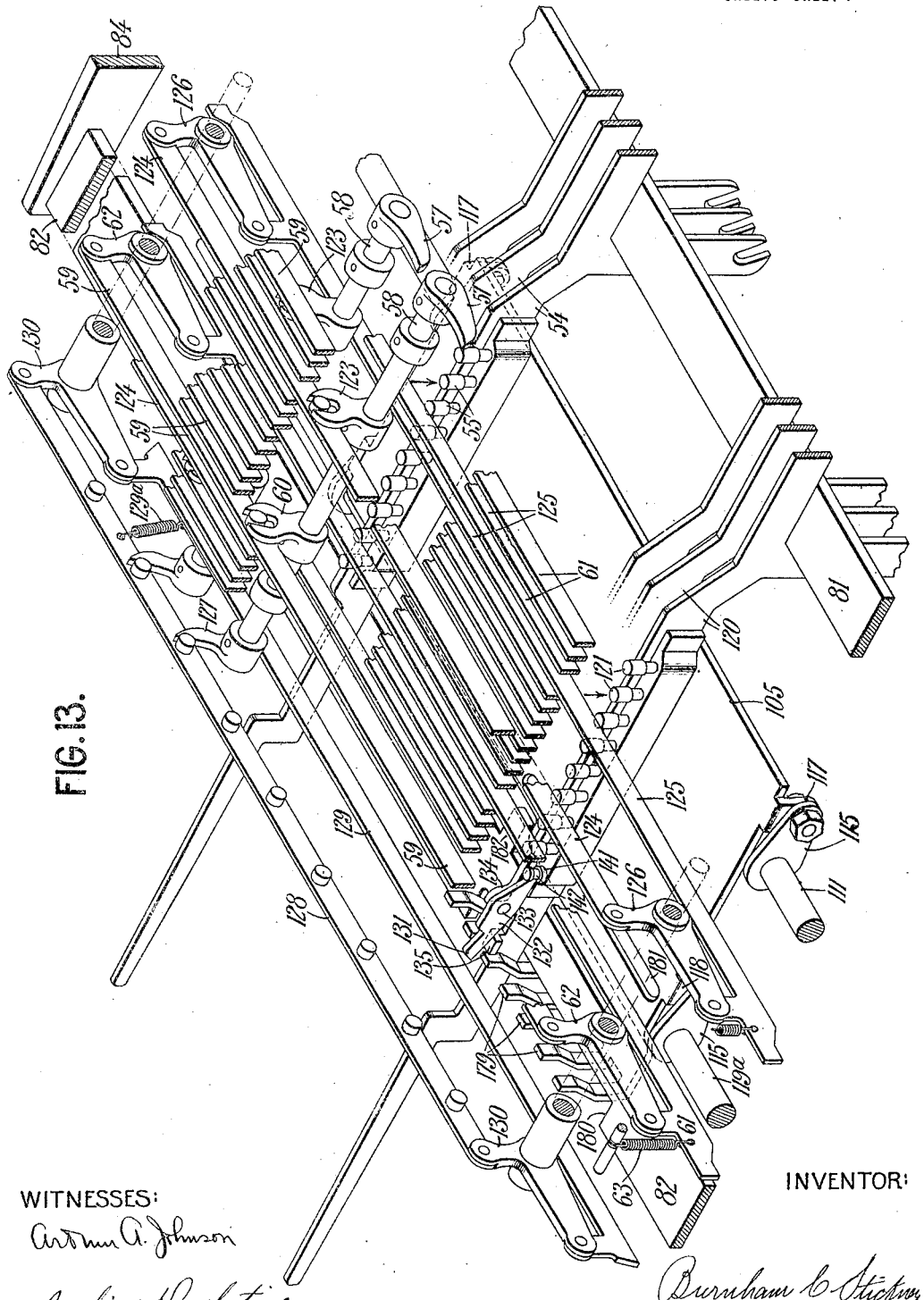

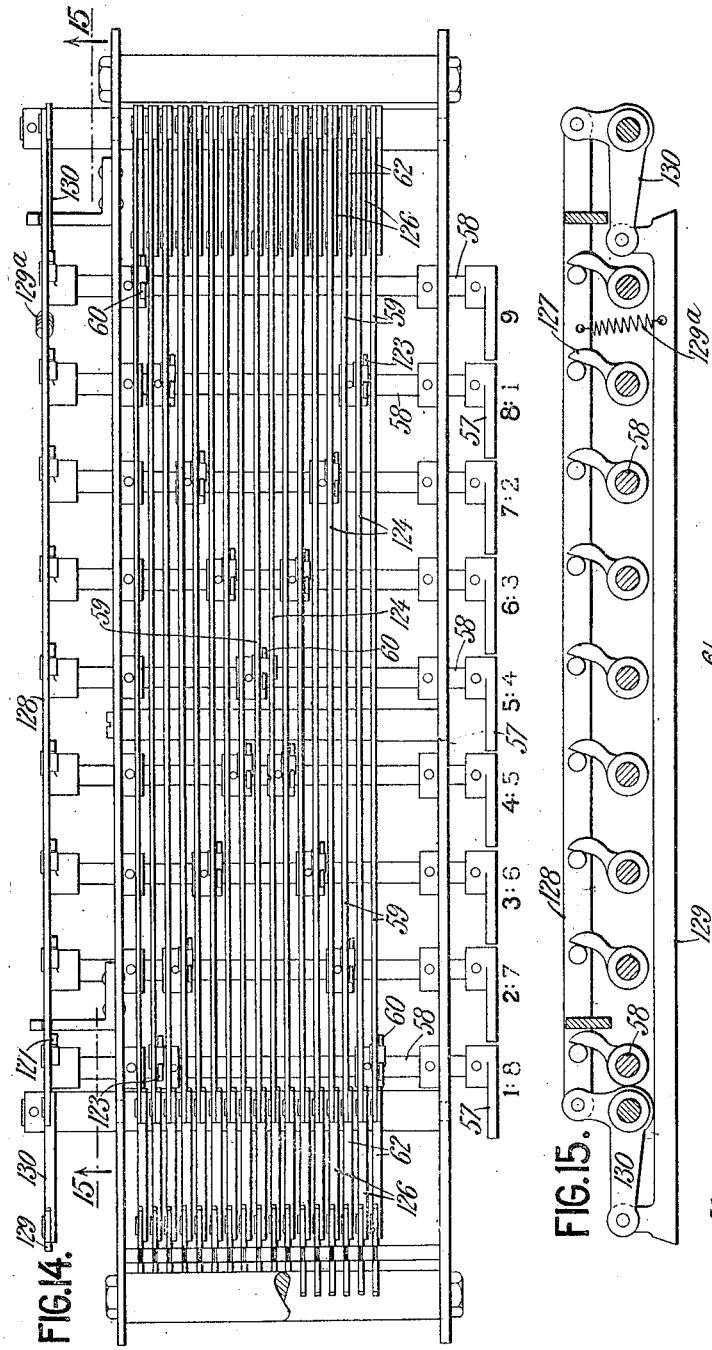

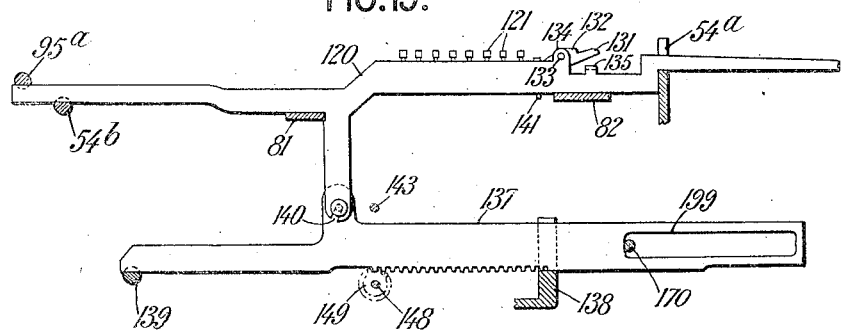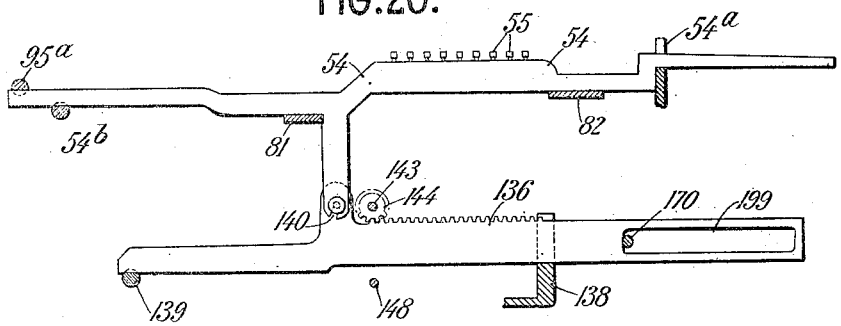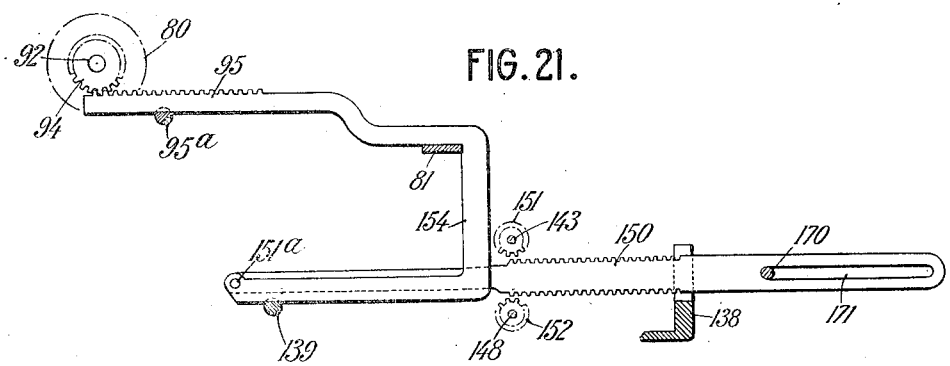

UNITED STATES PATENT OFFICE.

BURNHAM C. STICKNEY, OF ELIZABETH, NEW JERSEY, ASSIGNOR TO UNDERWOOD COMPUTING MACHINE COMPANY, OF NEW YORK, N. Y., A CORPORATION OF NEW YORK.

COMBINED TYPEWRITING AND COMPUTING MACHINE.

1,369,141. Specification of Letters Patent. Patented Feb. 22, 1921.

Application filed November 27, 1916. Serial No. 133,535.

*To all whom it may concern:*

Be it known that I, BURNHAM C. STICKNEY, a citizen of the United States, residing in Elizabeth, in the county of Union and State of New Jersey, have invented certain new and useful Improvements in Combined Typewriting and Computing Machines, of which the following is a specification.

My invention relates to combined typewriting and computing machines, and is herein applied to a machine of the Underwood-Hanson type, such as disclosed in my Patent No. 1,186,521, dated June 6, 1916, and in the patent to Frederick A. Hart, No. 1,190,171, dated July 4, 1916, and is an improvement thereon. In this general type of machines, numeral keys set up pins on indexing elements selected *seriatim* by a denominational selector on the typewriter carriage, and the pins thus set up on the indexing elements determine the distance through which the indexing elements are moved, at the actuation of a general operator, to rotate the numeral wheels of registers or totalizers.

In applying my invention, I provide two sets of master-driving devices, one master set for addition and one master set for subtraction, to any one of which one or more registers may be operatively connected at will, so that either type of computation, or no computation, may be selectively performed on any totalizer of the machine, and in any combination, at the will of the operative.

In carrying out my invention, in which I employ the complemental method of subtraction, I provide two sets of controlling devices, one for subtraction and one addition. These devices control racks to drive two sets of master-driving devices or shafts, to which any number of registers may be connected by suitable keys for selective computation. Although I have herein shown only three registers, it will be understood that any greater number of registers may be employed.

The two master sets of controlling devices are preferably in the nature of sliding bars having indexing pins associated therewith, on which the value of a number and its complement may be set on the addition and subtraction controlling devices, respectively. After the combination of pins have been set up on both the addition and subtraction controlling devices, the general operator is actuated to move the pin-bearing bars and the racks thereof to rotate the addition and subtraction master shafts, which actuate the registers connected thereto.

The two master sets of controlling devices have preliminary movements, to move the indexing pins carried thereby to a pin-setting position, which is effected by a single set of denominationally-arranged jacks engaged by one or more selectors on the typewriter carriage. Each selector, as it passes through a computing zone, actuates the jacks *seriatim*, to move the indexing elements simultaneously in each master set corresponding to the denominational position of the actuated jack, to a pin-setting position through the intermediary of a transposition device engaging with the controlling devices.

To connect any of the registers to either set of driving devices or shafts, I provide two keys for each register, one for addition and one for subtraction. Each set of keys controls a set of racks extending from the register to swing said racks into engagement with either set of driving devices.

To connect different combinations of registers, prior to each computation, which has been found desirable for certain kinds of work, I have provided means for locking the register racks in connected position for either addition or subtraction, and to release the locking means automatically at the completion of a computation by means of the general operator.

I have also found it advantageous to retain one or more registers connected during several computations, as, for example, during cross-totalizing. For this purpose, I have provided each register with an additional lock, manually controlled, which may be rendered effective to retain the register in connected position, at will. This lock engages, preferably, with one of the register state-controlling keys.

The machine is capable of a very wide range of use. Any totalizer or register may either add, subtract or remain neutral, regardless of what the other totalizers are doing, and this is done while retaining the method in commercial use upon the Underwood-Hanson machine of subtracting by complemental addition, so that, whether adding or subtracting, the wheels turn always in the same direction.

Other features and advantages will hereinafter appear.

In the accompanying drawings,

Figure 1 is a partial sectional side elevation of a combined typewriting and computing machine of the Underwood-Hanson type, showing my improvements embodied therein, the section being taken on substantially the line 1—1 of Fig. 5.

Fig. 2 is a fragmentary front view, showing the add and subtract keys and a handle in normal position, controlling a latch for locking either of the two keys in actuated position.

Fig. 3 is a view similar to Fig. 2, but shows the handle in its actuated position.

Fig. 4 is a sectional top plan view of the machine, taken on the line 4—4 of Fig. 1, some parts being omitted and some broken away for the purpose of clarification.

Fig. 5 is a sectional top plan view, taken at a lower level than that of Fig. 4, as indicated by the line 5—5 in Fig. 1, showing some of the parts which have been omitted from Fig. 4.

Fig. 6 is a sectional front elevation, taken on the line 6—6 of Fig. 1, showing the pin-setting mechanism associated with two sets of pin-carrying bars and the relative positions of the pin-carrying bars, master racks and the register racks, some of the parts being broken away.

Fig. 7 is a sectional side elevation of the computing mechanism, taken to the immediate right of the additive set of controlling elements and the parts associated therewith, as indicated by the line 7—7 of Fig. 5, and looking from the right end of the machine.

Fig. 8 is a view showing the connection from the operating handle to the general operator comprising the usual actuating cross-bars.

Fig. 9 is a front elevation of the linkages comprising cross connections from the jacks to the addition and subtraction controlling elements or pin bars, the section being taken at 9—9 of Fig. 7.

Figure 12:
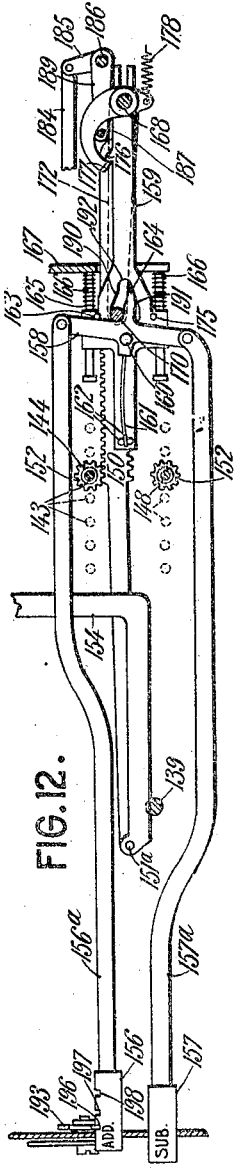

Fig. 12ª is a view showing the subtraction key locked in its actuated position by the manually-controlled latch engaging in a notch formed in the addition key.

Fig. 13 is a perspective view, showing both sets of addition and subtraction controlling devices, with the mechanism for setting the pins on the controlling devices, arranged above and crosswise of said controlling devices, and a universal plate, arranged beneath the controlling devices, for restoring the pins to their ineffective positions.

Fig. 14 is a top plan view of the pin-setting mechanism and the "9" pin-retracting mechanism, each key-actuated arm having its additive and subtractive value indicated thereat by solid and dotted numbers, respectively.

Fig. 15 is a sectional front elevation, showing the "9" pin-retracting bar and the mechanism associated therewith, the section being taken on the line 15—15 of Fig. 14.

Fig. 16 is a fragmentary side elevation, showing one of the subtraction-controlling devices, the pin-setting bars, and the pin-restoring plate, the parts being shown in their normal positions.

Fig. 17 is a view similar to Fig. 16, but shows the controlling device in a raised or pin-setting position, and a pin being set upon the bar, also the "9" pin being rendered ineffective by the "9" pin-retracting bar.

Fig. 18 is another view similar to Fig. 16, but shows the pin-restoring plate effective in restoring all of the pins to their normal positions.

Fig. 19 is a detail side elevation, showing one of the subtraction-controlling devices or pin-carrying bars and its corresponding master-controlling device or shaft connected thereto by an intermediate rack.

Fig. 20 is a view similar to Fig. 19, but shows an addition-controlling device or pin bar, and the master shaft controlled thereby.

Fig. 21 is a view similar to Fig. 19, showing two master-controlling devices, one for addition and one for subtraction, and one of the register or transfer racks in its neutral position.

Figure 22:
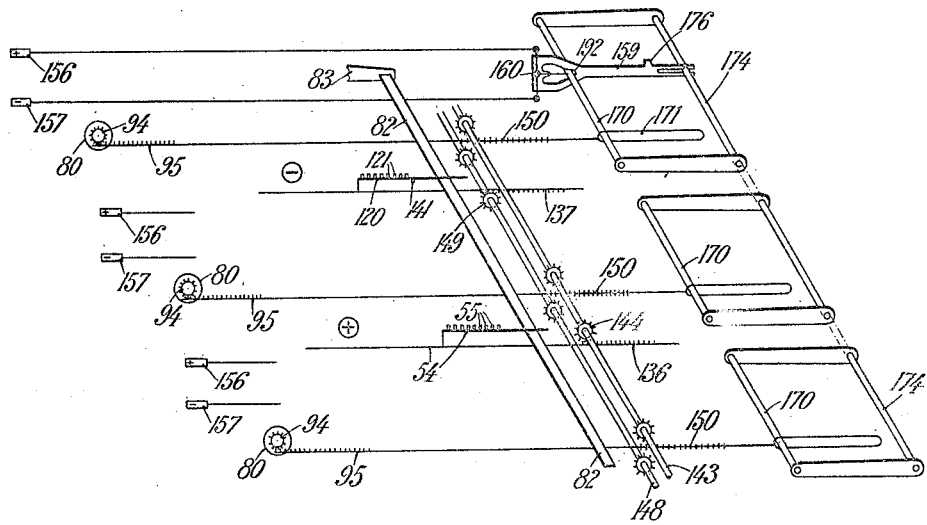

Fig. 22 is a schematic perspective view of my invention, showing one of each of the controlling devices, one transfer rack of each of the three registers, and the connecting means for one of the registers.

Figure 23:
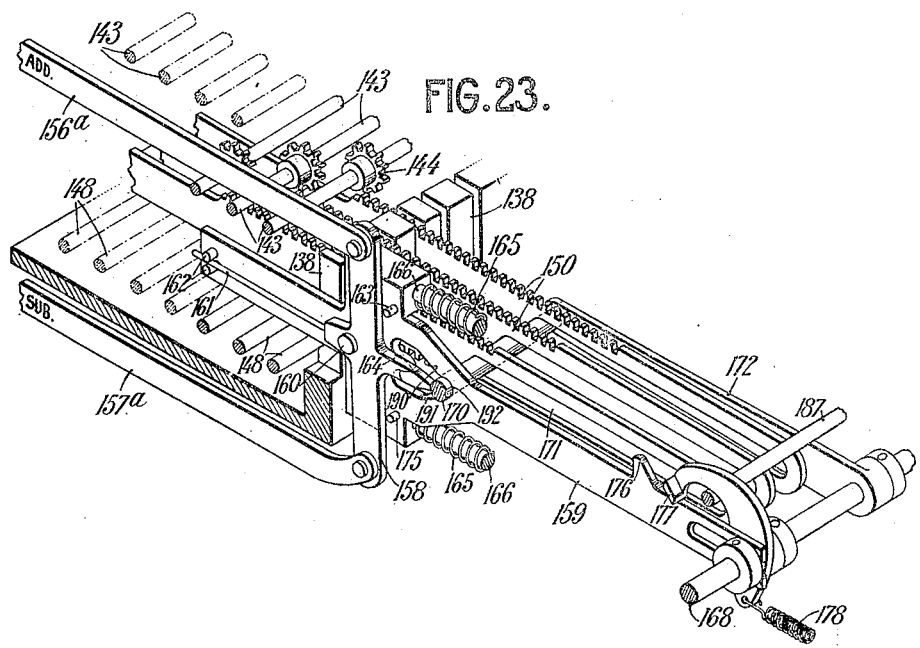

Fig. 23 is a perspective view of the connecting and computation controlling mechanism by which the register transfer racks may be connected with either the addition or subtraction master shafts, a pawl for locking said mechanism in its actuated position, and a universal bar which is controlled by the general operator for automatically releasing said mechanism.

Numeral keys 25 and alphabet keys 26 when actuated, move key levers 27 about a fulcrum 28, to swing bell-cranks 29 about a fulcrum 30 and cause the type-bars 31 to swing upwardly and rearwardly about a fulcrum 32, to cause the types 33 to print against a rotative platen 34. The platen is supported by a carriage 35 which moves from right to left of the machine on front and rear bars 36 and 37, respectively, and under the influence of a spring drum 38 connected to the carriage. The step-by-step feeding movements of the carriage are controlled by the usual mechanism including a rack 39 pivotally mounted on the carriage 35, which rotates a pinion 40, secured to an escapement wheel 41 provided with the usual teeth which engage with a loose and a fixed dog 42 and 43 supported by a dog rocker 44. Each type-bar is provided with a heel 45, which, when the type-bar is swung to printing position, engages with a universal bar 46 to vibrate the dog rocker 44, thus permitting the escapement wheel 41 to rotate step by step to allow the carriage to feed letter-space distances.

The machine is provided with the usual decimal tabulator including stops 50, which coöperate with column stops 51 on a stop bar 52 supported by the carriage 35.

The computing mechanism includes a set of pin-carrying bars 54, preferably guided by a comb plate 54$^a$ and a slotted bar 54$^b$, which are raised one at a time to a pin-setting position while the carriage is passing through a computing zone.

When a numeral key 25 is depressed while one of the bars 54 is in its raised position, an indexing pin 55, corresponding in value to the number of the depressed numeral key, will be set thereon. Each key lever has a pendant 56 which engages with an arm 57, extending from a shaft 58 to rock the latter and move a link 59 laterally, connected thereto by an arm 60 extending from the rock shaft 58. The lateral movement of the link 59 transmits a vertical downward movement to a pin-setting element or cross-bar 61 through bell cranks 62, to set or depress a pin on any pin-carrying bar in a pin-setting position. Each pin-setting bar is moved against the tension of a return spring 63.

To selectively raise the pin-carrying bars 54 to pin-setting positions, the typewriter carriage is provided with selectors 65, adjustably mounted on a cross-rod 66, there being one for each computing zone. When the carriage reaches a computing zone, a roller 65$^a$ of the selector 65 rides upon a roller 67, centrally located on the machine, to bring a tappet 68 into coöperative relation with jacks 69, arranged above the roller 67. As the carriage moves through the computing zone, the tappet 68 engages with the jacks 69 individually, to move a thrust rod 70 downwardly to rock a lever 71 about a fulcrum 72, the forward end 73 of the lever 71 (Figs. 4 and 9), engaging with a lug 74 projecting downwardly from a cross-bar 75, each cross-bar having an upwardly projecting lug 76 engaging with the pin bar 54; the lugs 74 and 76, being so arranged lengthwise of the bar so that the extreme right-hand lever 71 of highest denominational position will engage with the pin-carrying bar to the extreme left, which is also of highest denominational position. The transposing bar 75 is guided in its upward movement by bell cranks 77 and 78 connected to each other by a link 79.

The index pins 55 determine the extent of rotation of dial wheels 80 and are arranged in rows on the bars 54, which are moved forwardly by a general operator to rotate the dial wheels.

The general operator, including cross-bars 81 and 82 extending from plates 83 and 84, may be moved forwardly, in any convenient manner preferable, by a handle 85 which rotates a shaft 86, moving gear sectors 87 therewith (Figs. 1, 4 and 8), to rotate pinions 88 and move forwardly rack bars 89 secured to the plates 83 and 84 of the general operator. In its forward movement, the bar 82 of the general operator engages with the depressed pins 55 on the pin bars 54, thus moving each pin bar through a distance corresponding in value with the depressed pin thereon. This forward movement of the pin bars is transmitted to the register wheels by mechanism which will hereinafter be clearly described.

Each register comprises dial wheels 80 rotatively supported on a shaft 92, supported by suitable end plates 93 (Figs. 1 and 4). Each dial wheel 80 is driven in a clockwise direction only through a pinion 94, which is rotated by a register rack 95, guided by a slotted bar 95$^a$.

To prevent accidental displacement of the dial wheels, each dial wheel is provided with a toothed wheel 96 engaged by a detent lever 97.

The tens-carrying is effected during the return movement of the general operator through the left-hand rack 89, which rotates a gear wheel 98 (Figs. 4 and 10), meshing with a pinion 99 to rotate a square shaft 100, the connection between the pinion 99 and the shaft 100 being such that it will rotate the shaft in a clockwise direction, only. A set of toothed arms 101 are spirally arranged on the shaft 100, there being one set, for each register, which rotate carry-over pinions 102, the latter coöperating, being previously set to a carry-over position by a tooth 103 on the dial wheel 80, when a carry-over operation is to be effected to the next adjoining dial wheel. Each carry-over pinion has a three-toothed wheel 104 associated therewith, which engages with the toothed wheel 96 of the dial wheel of next higher denomination to effect a carry-over.

Restoring of the index pins 55, after a computing operation, is effected during the latter part of the return movement of the general operator by actuating a pin-restoring plate 105, which underlies all of the index pins 55. This is accomplished by a pawl 106 (Figs. 5, 6 and 8), pivoted on a screw 107 on the rack bar 89. As the general operator moves forward from the Fig. 8 position, the pawl 106 is swung about its pivot 107 against the tension of a spring 108 by a pawl 109. After the pawl 106 has moved past the pawl 109, it is snapped by spring 108 back against a stop pin or stud 110 on the rack bar 89. On the return movement of the general operator, the pawl 106 engages with the under side of the pawl 109 and moves it, to the dotted line position indicated in Fig. 8, to rock a shaft 111, to which it is fastened, and cause a movement of a finger 112, which engages with a projection 113, on the pin-restoring plate 105, to lift the latter, thus restoring all of the set pins 55.

The plate 105 is guided in its movement by parallel linkages, comprising bell cranks 114 at one side and arms 115 at the other side of said plate. The bell cranks 114 are connected to each other by a link 116, and move the plate 105 by being connected to ears 117 on the pin-restoring plate 105. The forward bell crank 114 and arm 115 are pivotally supported on the rock shaft 111 and move independently thereof. The bell crank 114 and the arm 115 at the rear of the plate 105 are connected to each other by a sleeve 119 and pivotally supported on a rod 119$^a$.

It should be understood that the pin-carrying bars 54 are controlling elements and are used for addition only.

I provide another set of controlling elements or pin-carrying bars 120 which are used for subtraction, each bar being provided with a row of pins 121.

The pin-carrying bars or controlling devices 54, as hereinbefore described, have a preliminary movement, to a pin-setting position, which is controlled by the denomination selectors 65 on the typewriter carriage. When the additive controlling devices are moved individually to a setting position, the bar corresponding to the same denominational position of the subtractive set of controlling devices is also raised to a pin-setting position, by lug 122 on the transposing bar 75, which engages with the rear end of the subtractive pin-carrying bar.

Let it be assumed that the typewriter carriage is in an adding zone, at which time the additive and subtractive pin-carrying bars, corresponding to that denominational position, will be in a raised position and ready for pin-setting. If a numeral key, other than the 5 key is now actuated, the pendant or stem 56, associated therewith, will engage with the arm 57 to rock the shaft 58, thus actuating the pin-setting bar 61 to set a pin on the additive pin bar, as hereinbefore described. At the same time, the pin 121 is set on the raised subtractive bar, by means of a second arm 123 on the shaft 58, which moves a link 124 to depress a subtractive pin-setting bar 125 by means of bell cranks 126. The construction and operation of the pin-setting mechanism associated with the "5" key are the same as of that associated with the other keys, except that it is unnecessary to provide the rock-shaft 58 associated with the "5" key with an extra arm 123, the arm 60 thereof serving an an operating connection to a link 124 as well as to a link 59.

According to the complementary method of subtraction, to perform subtractive operations, the complement of the number, which it is desirable to subtract, is added into the register. If in this method a number containing a "0" should be subtracted, as, for instance, if 100 is to be subtracted from a number in the register, it is necessary, since the complement of 100 is 899, to rotate the dial wheels of units and tens positions through nine digits distance. If the capacity of denominational position in the register is greater than that of the number to be subtracted, the dial wheels of higher denominational positions are also rotated through nine digits distance. Thus, let it be assumed that the register stands at 4 689 327 and it is desired to subtract 100, which is equal to 0 000 100. The complement of this number, which is 9 999 899 when added to the number in the register, will cause the subtractive value to be shown, thus, 4 689 226, which is the correct subtractive value except for one digit in the units denominational position, and which is automatically corrected by auxiliary units mechanism, which will hereinafter be explained, thus making the subtractive value 4 689 227.

To accomplish the foregoing, the "9" pins on the subtractive controlling devices are normally in a depressed position with the lower ends in the path of the pin-engaging cross-bar 82 of the general operator, so that while the carriage is in a computing zone, there will be no effect on the controlling devices corresponding to the denominational position of the computing zone, unless a number other than "0" is printed. should a number other than "0" be written, a pin corresponding to the additive value of the number is set on the additive controlling device, and the pin equal to the complementary value will be set on the subtractive controlling element.

While setting any pin equal in value from one to eight on the subtractive controlling device, it is necessary to render the "9" pin ineffective. Also, when actuating the "9" key, the "9" on any subtractive element is rendered ineffective. For this purpose, each rock shaft 58, has another arm thereon, 127, coöperating with a single link 128 to move a "9" pin-retracting bar 129 downwardly, by means of bell cranks 130 against the tension of springs 129$^a$. The pin-retracting bar 129, when a subtractive controlling element is in its raised or pin-setting position, engages with a tail 131 of a lever 132 to swing the latter about a pivot 133 on an ear 134 of the pin bar 120, and move the "9" pin 141 upwardly by engaging in a groove 142 thereon to withdraw the lower end of the pin 141 out of the path of the cross-bar 82 of the general operator. Each "9" pin-retracting lever 132 engages in its pin-retracting action with an ear 135 on the controlling element 120, to limit the motion thereof.

The additive and subtractive controlling devices are moved after a number has been written in a computing zone and its corresponding additive and subtractive value set up on the respective controlling devices by the operating handle 85, which, as hereinbefore described, moves the cross-bar 82 of the general operator forwardly. The forward movement of the cross-bar 82 is effective to move the controlling devices 54 and 120 forwardly through distances dependent upon the setting of the pins thereon. These movements of the controlling devices or pin-carrying bars 54 and 120 are transmitted to racks 136 and 137, respectively, guided in a comb plate 138 and a notch bar 139, there being a pin-and-slot connection 140 between the racks and the controlling devices, which permits a movement of the pin bars 54 and 120 to a pin-setting position, independently of the rack associated therewith.

The movements of the additive racks 136 are transmitted to additive master-driving devices or shafts 143 through pinions 144, the shafts 143 being arranged above the racks 136 and extend crosswise of the machine (Figs. 5, 6 and 7), and are supported by end brackets 145 and 146 and central brackets 147. The movements of the subtractive racks 137 are transmitted in a similar way to subtractive master-driving devices or shafts 148 through pinions 149. The master shafts 148 are arranged beneath the subtractive racks 137 and supported by the end brackets 145 and 146 and the central brackets 147.

Any number of registers may be connected to either set of additive and subtractive master-driving devices or shafts 143 and 148, respectively, there being only three shown in the present case. This is accomplished by swinging transfer racks 150 about their pivots 151$^a$ into engagement with pinions 151 and 152 on the additive and subtractive master shafts, respectively; each transfer rack being pivotally connected at 151$^a$ to a downwardly and forwardly extending portion 154 of the register rack 95, the pair of racks forming register-actuating devices. It should be understood that there is one additive master shaft and one subtractive master shaft, both corresponding to the same denominational positions of the different registers, and that after the transfer racks 150 have been connected to either set of master shafts, by mechanism which will presently be described, the movements of the master shafts, under the control of the controlling devices are effective to rotate the register wheels 80 through digits distances dependent upon the setting of the pins on the controlling devices.

To connect the registers with either set of master-driving devices 143 and 148, each register is provided with an "add" key 156 and "sub" key 157 (Figs. 4, 5, 11, 12 and 23).

Figure 10:
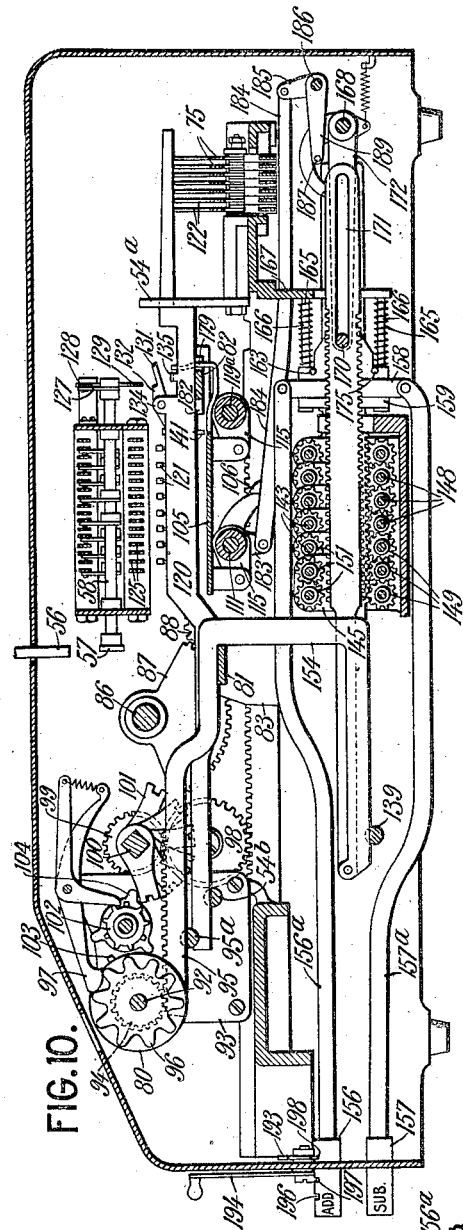
Fig. 10 is a sectional side elevation of the computing mechanism, the section being taken to the immediate right of the subtractive set of controlling elements and their associated parts, as indicated by the line 10—10 in Fig. 4, and looking in the same direction as in Fig. 7.
Figure 12A:
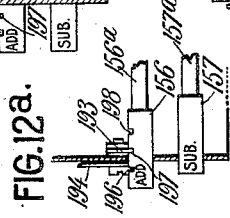
Fig. 12 is a view similar to Fig. 11, but shows the addition key actuated and the parts locked in their actuated positions by a pawl arranged at the rear of the machine.

To connect a register additively, the "add" key 156 is actuated to move a thrust rod 156$^a$ rearwardly and swing a lever 158, supported by a slide 159, about a pivot 160, against the tension of a centralizing spring 161 projecting from the lever 158, the free end of the spring being held between two pins 162 on the slide 159. The lever 158 swings against the tension of the spring 161 until it strikes the stop pin 163, to shift a locking and guiding finger 164 to an additive position. A continued rearward movement of the key 156 will move the slide 159 rearwardly against the tension of springs 165, the slide being guided on studs 166 secured to a plate 167 and a rod 168. This movement, by means of the finger 164, which acts as a cam, is effective to swing a cross-bar or universal bar 170 upwardly, the universal bar extending through slots 171 in the transfer rack bars 150 and through a slot in the slide 159, to connect the transfer register racks 150 with the additive master shafts 143, the bar 170 being guided in its movement by arms 172 and 173 extending therefrom and pivotally supported on the rod 168 (Figs. 5 and 10).

To connect the register for subtraction, the "sub" key 157 associated with the register which it is desired to connect is actuated, thus swinging the lever 158 about its pivot 160 against the tension of the spring 161, until the pivotal movement of the lever 158 is arrested by a stop pin 175, when the finger 164 will have been raised from a neutral position, in which it locks the bar 170 in its normal position, to a position above said bar 170. A further movement of the subtraction key 157 is effective to move the slide 159 rearwardly against the tension of the springs 165, and, with the aid of the finger 164, cams the universal bar downwardly, thus connecting the transfer racks 150 associated therewith to the subtractive master shafts 148.

To lock the register-connecting mechanism until after a computing operation, the slide 159 is provided with a projection 176, which, when the slide moves rearwardly, slips past and is engaged by a pawl 177, controlled by a spring 178 and pivotally supported on the rod 168.

The subtractive-indexing pins 121 are restored to their ineffective positions simultaneously with the additive pins 55 by the restoring plate 105 during the latter part of the return movement of the general operator. In order that this simultaneous restoration may be accomplished, the pin-restoring plate 105 is of such size and is so located (see Fig. 4) as to underlie both sets of indexing pins, so as to be equally, therefore, effective as a restoring device for both.

To restore the "9" pins 141 to their normal positions, I have provided that part of the pin-restoring plate 105, which underlies the subtractive set of controlling devices, with fingers 179, which project through a recess 180 in the cross-bar 82 of the general operator, to engage the tails 131 of the pin-restoring levers 132 (Figs. 4, 13 and 18) and rock said levers. The levers 132 engage in the grooves 142 of the pins 141, to restore the latter to their normal positions. To permit the pins 141 to be lowered while the pin-restoring plate is being raised, the latter has a slot 181 formed therein into which the lower ends of the "9" pins 141 project.

The auxiliary units mechanism for carrying the extra digit to the units dial wheel, which is necessary when employing the complemental method of subtraction, includes a projection 182 on the cross-bar 82, so that the bar 82 engages with the units-controlling device one digit distance in advance of the other bars. Thus, if the "1" pin is set on the units-controlling device the latter will be moved through a two digit distance, or, if the "4" pin is set, the controlling device will be moved through a five digit distance, etc.

Figure 11:
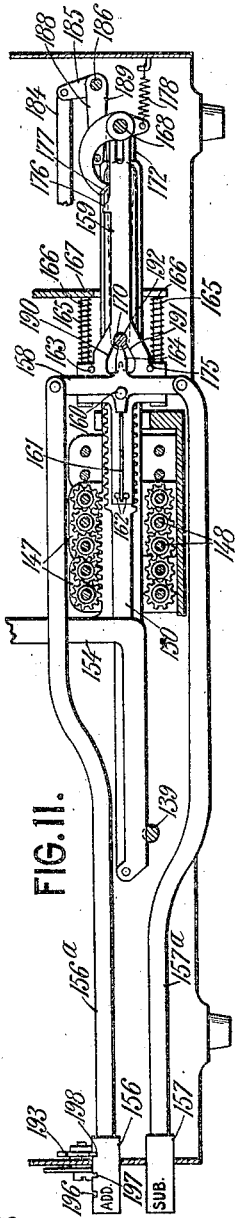
Fig. 11 is a sectional side elevation, showing the addition and subtraction controlling mechanism and the keys associated therewith, the parts being in their normal positions, the section being taken on the line 11—11 of Fig. 5.

All of the register-connecting mechanisms are released from their respective pawls 177, after each computation by the general operator, which, during the latter part of its return movement, rocks the shaft 111 by means of the pawl 106, as hereinbefore described. An arm 183 on the shaft 111 moves a link 184, connected with an arm 185, rearwardly, to rock a shaft 186 and cause an upward movement of a cross-rod or universal bar 187 having arms 188 and 189 secured to the rock shaft 186. The universal bar 187 underlies all of the pawls 177 associated with the different register mechanisms to swing the pawls against the tension of their springs 178 and out of engagement with the projections 176 on the slide 159, after which each slide 159 is returned to its normal position by the return springs 165. During the return movement of the slide 159, the cams 190 and 191 thereon become effective to move the universal bar 170 to its normal position, as indicated in Fig. 11, where the bar 170 is held in a slot 192 in a slide 159 by the finger 164 of the lever 158. While the bar 170 is moving to its normal position, it moves the set of register transfer racks 150 associated therewith from either of two effective positions to a neutral or central position, as indicated in Fig. 10.

To retain any register connected to either of the additive or subtractive master shafts for several computating operations, which is sometimes desirable, I have provided each register with a latch 193, which, when the "add" key of the register is actuated, may be moved from the Fig. 2 position to the Fig. 3 position by a spring detent lever or finger-piece 194. The latch 193 swings about a pivot 195 and into a slot 196 formed in the "add" key 156 (Fig. 12). To retain the register connected for subtraction for several computations, the latch 193 is caused to engage in a notch 197, as shown in Fig. 12ª.

To lock the "add" and "sub" keys 156 and 157, respectively, against accidental displacement from their neutral positions, I have provided the key 156 with a notch 198 into which the latch 193 is moved when so desired.

Since the groups of racks 136 and 137 overlap the groups of transfer racks, I have provided some of the racks 136 and 137 with a slot 199, so as to permit a free movement of the universal bars 170.

The computing mechanism is rendered ineffective to prevent any unnecessary movements of the controlling devices to their pin-setting positions and also the setting of the pins thereon when writing numbers which are not to be run into the registers by a key 200 which moves a link 201, pivotally connected thereto at 201ª, rearwardly to swing a bell crank 202 about a pivot 203 and rock a shaft 204 by means of a stud 205 on the bell crank 202, engaging with an arm 206 fixed to the rock shaft 204, thus swinging the shiftable element or roller 67, carried by two arms 207 secured to the rock shaft 204, to an ineffective position against the tension of a spring 208, in which position the roller 67 is out of the path of the rollers 65ª on the selectors 65. Thus, the carriage may be moved back and forth, and the selectors will remain in their normal or ineffective positions.

To lock the roller 67 in its ineffective position, I have provided a finger-piece 209, which projects from the thrust rod 201 out of the machine through a slot 210, so that it may be moved by the operator to engage with a shoulder 211, when the key 200 is in its actuated position, thus locking the parts against return movement. To release the parts, the finger-piece 209 is raised out of engagement with the shoulder 211 when the parts are returned to their normal positions by the spring 208.

It should be understood that there are two sets of master-driving shafts 143 and 148, respectively, to which any number of registers may be connected, there being three shown in the present machine. Each register is provided with an "add" and a "sub" key, each set of keys controlling a set of transfer racks extending from the register with which the keys are associated, and can be connected to either set of master-driving shafts. Further, it should be understood that the master-driving shafts are controlled by preliminary representation mechanism, comprising two sets of controlling bars, having indexing pins thereon, and that these controlling devices are moved to a pin-setting position by the step-by-step movement of the typewriter carriage while the latter moves through a computing zone. It should also be understood that the key 200 is effective to interrupt the control of the typewriter carriage over the controlling devices 54 and 120, by swinging the roller 67 to a position where it is ineffective to cause the tappets 68 of the selectors 65 to be swung into engagement with the jacks 69. It should also be understood that the spring 208 is effective to move the roller 67 to its effective position after the finger-piece 209 has been released from the shoulder 211.

Variations may be resorted to within the scope of the invention, and portions of the improvements may be used without others.

Having thus described my invention, I claim:

1. In a computing machine, in combination, a set of computing wheels, a set of variably movable drivers for said wheels, a second set of variably movable drivers for said wheels, operating means for said drivers including variably settable valuating devices individual to each set for effecting movements of drivers of different sets in accordance with component elements of computations of different character, and means for selectively causing said computing wheels to be operated at any computing operation, in accordance with the movements of either of said sets of drivers to the exclusion of the other, depending upon the nature of the computation to be effected.

2. In a computing machine, in combination, a set of computing wheels, a set of addition-drivers therefor, a set of subtraction-drivers therefor, operating means for said drivers including a set of variably settable addition-controllers and a set of variably settable subtraction-controllers, for effecting movements of drivers of one set in accordance with the component elements of a number as represented by its digits, and for effecting movements of drivers of the other set in accordance with the component elements of an arithmetical complement of the same number, and means for causing said computing wheels to be operated in accordance with the movements of the first-mentioned set of drivers when it is desired to add, and in accordance with the movements of the second-mentioned set of drivers when it is desired to subtract.

3. In a computing machine, in combination, a set of computing wheels, a set of controllers to determine the movements of said wheels when adding, a second set of controllers to determine their movements when subtracting, indexing devices for each set of controllers, means for setting indexing devices of one of said sets of controllers in accordance with component elements of a number as represented by its digits, and for setting indexing devices of the other set of controllers in accordance with component elements of an arithmetical complement of said number, operating mechanism including means for moving said controllers in accordance with the settings of said indexing devices, and means for causing said computing wheels to be operated in accordance with the movements of said addition-controllers when it is desired to add, and in accordance with the movements of said subtraction-controllers when it is desired to subtract.

4. In a computing machine, in combination, a plurality of computing heads, a set of addition-master-drivers therefor, a set of subtraction-master-drivers therefor, each set of drivers being available for common use to drive a plurality of said heads, operating means for said drivers, including means for imparting movements to drivers of one set in accordance with the component elements of a number as represented by its digits, and for imparting movements to the drivers of the other set in accordance with the component elements of an arithmetical complement of the same number, and a set of variably settable transfer members for each computing head, by means of which a plurality of said heads may be selectively connected to said drivers, so as to be actuated during a single operation of the machine, and in such manner as to cause a number to be added on one or more heads, and to be subtracted from one or more heads in various combinations which may be predetermined by the settings of the corresponding sets of transfer members.

5. In a combined typewriting and computing machine, the combination with a typewriter including a traveling carriage, and means including number keys for controlling its movements in letter-spacing direction, of a set of computing wheels, a plurality of sets of controllers therefor, the corresponding controllers of different sets being variably movable with respect to each other, indexing devices for said controllers for determining the extent of their movements when operated, means controlled by the travel of said carriage for determining a computing zone and for priming corresponding controllers of the different sets so that their indexing devices may be set as the carriage is advanced through said zone, means controlled by said keys as the carriage is advanced through said zone for setting indexing devices of corresponding controllers of the different sets in accordance with a predetermined plan, so as to predetermine the movements of different sets in accordance with the component elements of computing operations of different character, operating means for moving said controllers in accordance with the settings of said indexing devices, and means for causing said computing wheels to be selectively operated in accordance with the movements of any one of said sets of controllers, depending on the nature of the computation desired to be effected.

6. In a computing machine, in combination, a set of computing wheels, a plurality of sets of variably movable drivers for said wheels, operating means for said drivers including variably settable valuating devices individual to each set for effecting movements of drivers of different sets in accordance with component elements of computations of different character, and variably settable means for causing said computing wheels to be selectively operated at each computing operation in accordance with the movements of any one of said sets of drivers, depending upon the nature of the computation to be effected.

7. In a computing machine, the combination with a set of computing wheels, of a plurality of sets of variably movable drivers for said wheels, selective means for establishing connections for driving said wheels from any one set of said drivers, operating mechanism including a variably settable controller for each driver for determining the extent of its movement when operated, and an intermediate driving member for transmitting motion from each controller to its corresponding driver, said intermediate driving member being connected to its controller by relatively movable engaging parts, so that a priming movement may be imparted to said controller to set the same without interrupting the driving relation from said controller through said intermediate member to said driver.

8. In a computing machine, in combination, a plurality of totalizers each comprising a set of computing wheels, a plurality of sets of master-drivers, each set including drivers individual to different denominational orders represented in each of said totalizers, and each driver being available in common for driving wheels of corresponding denomination in each of a plurality of said totalizers, operating means including means individual to each set of drivers for imparting movements to different sets, corresponding, respectively, to component elements of computations of different character, and selective means for causing the respective computing wheels of any totalizer to be driven in accordance with movements of master-drivers of corresponding denominational order of any one of said sets to the exclusion of others, depending upon the nature of the computation desired to be effected.

9. In a computing machine, in combination, a plurality of computing heads, a set of addition-master-drivers, a set of subtraction-master-drivers, said drivers being available in common for driving a plurality of said heads, operating means for said drivers including variably settable controllers for causing drivers of one set to be moved in accordance with component elements of a number as represented by its digits, and for causing drivers of the other set to be moved in accordance with component elements of an arithmetical complement of the same number, and means for selectively connecting a plurality of said computing heads to said common drivers at each operation of said machine, said connecting means including variably settable means for each head for driving said head from either set of drivers to the exclusion of the other, so that said heads may be caused to be driven from said addition and subtraction drivers in varying combinations.

10. In a computing machine, in combination, a set of computing wheels, a plurality of sets of variably settable controllers for determining movements of said wheels when operated, means for setting controllers of different sets in accordance with component elements of computations of different character, computation-state-setting mechanism for said computing wheels to cause their movements when operated to be controlled in accordance with the controller-settings of any one of said sets, depending on the nature of the computation to be effected, and operating mechanism including means for moving said computing wheels in accordance with the settings of controllers of the set selected by the setting of said computation-state-setting mechanism.

11. In a computing machine, in combination, a plurality of computing heads, a plurality of sets of variably settable controllers for controlling the operation of said heads when actuated, means for setting controllers of different sets in accordance with the component elements of computations of different character, actuating means including selective setting mechanism, for conditioning a plurality of said computing heads to be effected at a single operation of said machine, each head being selectively settable for actuation in accordance with the settings of controllers of any one of said sets, and operating mechanism including means for actuating all heads thus conditioned to be effective, each in accordance with the settings of controllers of the set selected by the setting of its actuating mechanism.

12. In a combined typewriting and computing machine, the combination with a typewriter including a traveling carriage, and means including number keys for controlling its movements in letter-spacing direction, of a set of computing wheels, a set of addition-controllers therefor, a set of subtraction-controllers therefor, indexing devices for said controllers for determining the extent of their movements when operated, means controlled by the travel of said carriage for determining a computing zone and for priming corresponding controllers of the different sets so that their indexing devices may be set as the carriage is advanced through said zone, means controlled by said keys as the carriage is advanced through said zone for setting indexing devices of controllers of one of said sets in accordance with the digits of a number, and for setting indexing devices of corresponding controllers of the other set in accordance with elements of an arithmetical complement of the same number, operating means for moving said controllers in accordance with the settings of said indexing devices, and means for causing said computing wheels to be selectively operated in accordance with the movements of any one of said sets of controllers, depending on the nature of the computation desired to be effected.

13. In a computing machine, in combination, a totalizer comprising a set of computing wheels, a plurality of sets of variably movable controllers therefor, each set including controllers individual to different denominational orders represented in said totalizer, indexing devices for said controllers for determining the extent of their movements when operated, a set of number keys, means controlled by said number keys for selecting controllers of different denominational order in succession, and for simultaneously priming all controllers of like denomination as selected, means controlled by said keys for setting indexing devices of corresponding controllers, as thus primed, in accordance with a predetermined plan, so as to determine movements of different sets in accordance with the component elements of computing operations of different character, operating means for moving said controllers in accordance with the settings of said indexing devices, and means for selectively causing said computing wheels to be operated in accordance with the movements of controllers of a set indexed in accordance with the nature of the computation desired to be effected.

14. In a computing machine, in combination, a totalizer comprising a set of computing wheels, a plurality of sets of controllers therefor, each set including controllers individual to different denominational orders represented in said totalizer, indexing devices for said controllers, a set of number keys, means controlled by said number keys for selecting controllers of different denominational order in succession, and for simultaneously priming all controllers of like denomination as selected, means controlled by said keys for setting indexing devices of corresponding controllers, as thus primed, in accordance with a predetermined plan, controllers of different sets being thus indexed in accordance with the component elements of computing operations of different character, computation-state-setting mechanism for said computing wheels to cause their movements when operated to be controlled in accordance with the indexing of any one of said sets of controllers, depending on the nature of the computation to be effected, and operating mechanism including means for moving said computing wheels in accordance with the index-settings of controllers of the set selected by the setting of said computation-state-setting mechanism.

15. In a computing machine, in combination, a set of computing wheels, a set of addition-controllers therefor, a set of subtraction-controllers therefor, indexing devices for said controllers, a set of number keys, means controlled by said number keys for selectively priming corresponding controllers of each set, means controlled by said keys for setting indexing devices of primed controllers of one of said sets in accordance with digits of a number, and for setting indexing devices of primed controllers of the other of said sets in accordance with corresponding elements of an arithmetical complement of the same number, computation-state-setting mechanism for said computing wheels to cause their movements to be controlled in accordance with the settings of said addition-controllers when it is desired to add, and in accordance with said subtraction-controllers when it is desired to subtract, and operating mechanism including means for moving said computing wheels in accordance with the setting of controllers of the set selected by the setting of said computation-state-setting mechanism.

16. In a computing machine, in combination, a set of computing wheels, a plurality of sets of variably settable controllers for determining movements of said wheels when operated, means for setting controllers of different sets in accordance with component elements of computations of different character, computation-state-setting mechanism for said computing wheels to cause their movements, when operated, to be controlled in accordance with the indexing of any one of said sets of controllers, or to render them independent of them all, and operating mechanism for effecting movements of said computing wheels in accordance with index-settings of any set of controllers selected by the setting of said state-setting mechanism.

17. In a computing machine, in combination, a totalizer comprising a set of computing wheels, a set of actuators therefor, a set of drivers for said actuators, a setting mechanism for establishing a driving relation between said actuators and their drivers, said setting mechanism including means tending normally to hold said actuators and said drivers in disengaged relation, means for automatically locking said setting mechanism when operated to effect a driving relation between said parts, to maintain said driving relation during a computing operation, and operating mechanism for said machine including means for automatically rendering said locking means ineffective, after a computing operation has been effected, to permit said setting mechanism to restore the normal disengaged relation between said actuators and their drivers.

18. In a computing machine, in combination, a totalizer comprising a set of computing wheels, a set of actuators therefor, two sets of drivers for said actuators, one set for addition, and one set for subtraction, a state-setting mechanism for selectively establishing driving relations between said actuators and drivers of either of said sets, said state-setting mechanism including means normally tending to cause its parts to assume a neutral relation preventing an engagement between said actuators and either of said sets of drivers, means for automatically locking said state-setting mechanism when operated to effect a driving engagement for either addition or subtraction, and operating mechanism for effecting a computation in accordance with said setting, and including means for automatically rendering said locking means ineffective after said computation has been effected so as to permit said state-setting mechanism to re- assume its neutral state, and thus restore the normal disengaged relation between said actuators and their drivers.

19. In a computing machine, in combination, a plurality of totalizers, each comprising computing wheels representing orders of different denomination, a set of actuators for each totalizer, the different actuators of a set representing different denominational orders, a set of master-drivers, each driver representing a different denominational order and available in common to drive actuators of corresponding denomination in any or all of said sets, a setting mechanism for each totalizer for establishing driving connections between its actuators and said master-drivers, each setting mechanism including means normally tending to cause its parts to assume a neutral relation to hold said actuators and said master-drivers normally disengaged, means for automatically locking each of said setting-mechanisms when operated to effect a driving engagement of the parts controlled thereby, and operating mechanism for said machine including a common lock-releasing member for automatically rendering locking devices of all operated setting mechanisms ineffective, after a computing operation has been effected, so as to permit each of said setting mechanisms to return to its neutral state, and thus restore the normal disengaged relation between the actuators and their drivers.

20. In a computing machine, in combination, a plurality of totalizers each comprising computing wheels representing orders of different denomination, a set of actuators for each totalizer, the different actuators of a set representing different denominational orders, two sets of drivers, one set for addition and one set for subtraction, each driver of a set representing a different denominational order and available in common to drive actuators of corresponding denomination in any or all of said sets, a state-setting mechanism for each totalizer for selectively establishing driving relations between its actuators and drivers of either of said sets, each of said state-setting mechanisms including means tending to cause its parts to normally assume a neutral relation preventing engagement between said actuators and drivers of either of said sets, means for automatically locking each of said state-setting mechanisms when operated to effect a driving engagement for either addition or subtraction, and operating mechanism for said machine including a common lock-releasing member for automatically rendering locking devices of all operated state-setting mechanisms ineffective, after a computing operation has been effected, so as to permit each of said state-setting mechanisms to return to its neutral state, and thus restore the normally disengaged relation between said actuators and their drivers.

21. In a computing machine, in combination, a totalizer comprising a set of computing wheels, a set of actuating racks therefor, each rack having individual driving engagement with one of said computing wheels, a second set of racks, each rack of the second mentioned set having a pivoted connection with a corresponding rack of the first-mentioned set, a set of drivers, one driver for each pair of pivoted racks, and a setting mechanism including a single means for simultaneously moving all of the racks of the second-mentioned set about their pivoted connections into driving engagement with the corresponding drivers to effect a driving relation between each of said drivers and a corresponding computing wheel.

22. In a computing machine, in combination, a totalizer comprising a set of computing wheels, operating mechanism therefor, said wheels being normally disconnected from said operating mechanism, setting mechanism to control the driving relations between said operating mechanism and said wheels, said setting mechanism including mutually engaging parts normally effective as a lock to prevent accidental driving connections between said parts, and manually operative means for effecting a relative movement of said parts to automatically render said locking means ineffective, and to establish a driving relation between said operating mechanism and said wheels.

23. In a computing machine, in combination, a totalizer comprising a plurality of computing wheels, a set of actuating devices having individual driving relations with said wheels, two sets of drivers, one for addition and one for subtraction, each set including a separate driver for each of said actuating devices, operating mechanism including means for concomitantly and variably moving corresponding drivers of different sets in accordance with a predetermined plan, and state-setting means controlling setting movements of said actuators for selectively establishing driving relations between said actuators and drivers of one of said sets when it is desired to add and between said actuators and drivers of the other set when it is desired to subtract.

24. In a computing machine, in combination, a totalizer comprising a set of computing wheels, a set of actuating racks therefor, each rack having individual driving relation with one of said computing wheels, a second set of racks, each rack of the second mentioned set having a pivoted connection with a corresponding rack of the first-mentioned set, two sets of drivers, one set for addition and one set for subtraction, each set including a driver corresponding to each pair of pivoted racks, and a state-setting mechanism including means for moving racks of the second-mentioned set about their pivoted connections into engaging relation with drivers of one of said sets when it is desired to add and with drivers of the other of said sets when it is desired to subtract.

25. In a computing machine, in combination, a plurality of totalizers, a plurality of sets of actuators, one set for each totalizer, a set of driving members, each member of the set being available in common to drive corresponding actuators of all of said sets, and a setting mechanism for each totalizer to control the driving relation between its actuators and said driving members, each setting mechanism including means normally causing its parts to assume a neutral relation and to hold actuators of the corresponding totalizer and said drivers in disengaged relation, and also including means, effective when set, to maintain actuators of the corresponding totalizer and said drivers in engaging relation during a computing operation.

26. In a computing machine, in combination, a set of computing wheels, operating mechanism therefor including two sets of drivers, one set for addition and one set for subtraction, said wheels being normally disconnected from said drivers, a state-setting mechanism for controlling the driving relations between said drivers and said wheels, said state-setting mechanism including mutually engaging parts normally effective as a lock to prevent accidental driving connections between said parts, and manually operative means for selectively effecting a relative movement of said parts to automatically render said locking means ineffective, and to establish driving relations between said computing wheels and the drivers of one or the other of said sets.

27. In a computing machine, in combination, a set of computing wheels, actuators therefor, a set of drivers for said actuators, and a setting mechanism to control the driving relations between said actuators and their drivers, said setting mechanism including a movably mounted universal bar having engaging relation with said actuators, a movably mounted cam member having engaging relation with said bar, a setting and locking arm for said bar, movably mounted on said cam member, the normal relation between said arm and said cam member being such as to hold said bar locked in a neutral position with said actuators disengaged from their drivers, and a manipulator for effecting an initial relative movement between said arm and said cam member to unlock said bar, followed by a common movement of said cam member and said arm to effect a setting movement of said bar to establish a driving connection between said actuators and their drivers.

28. In a computing machine, in combination, a set of computing wheels, actuators therefor, two sets of drivers for said actuators, one set for addition and one set for subtraction, and a state-setting mechanism to control the driving relations between said actuators and said drivers, said setting mechanism including a movably mounted universal bar having engaging relation with said actuators, a movably mounted cam member having engaging relation with said bar, a setting and locking arm for said bar, movably mounted on said cam member, the normal relation between said arm and said cam member being such as to hold said bar locked in a neutral position with said actuators disengaged from the drivers of both of said sets, and manually operative means for selectively effecting an initial movement of said arm relatively to said cam member in one sense to unlock said bar, followed by a common movement of said cam member and said arm to effect a setting movement of said bar to establish a driving connection between said actuators and one of said sets of drivers when it is desired to add, said manually operative means being also capable of effecting an unlocking of said bar by an initial movement of said arm relatively to said cam member in a different sense, followed by a corresponding common movement of said cam member and said arm to effect an opposite setting movement of said bar to establish a driving connection between said actuators and the other of said sets of drivers when it is desired to subtract.

29. In a computing machine, in combination, a totalizer comprising a set of computing wheels, actuators therefor, two sets of drivers for said actuators, each set including individual drivers corresponding to each of said actuators, operating mechanism including means for variably moving corresponding drivers of different sets in accordance with a predetermined plan, and a state-setting mechanism for selectively establishing driving connections between said actuators and the drivers of either of said sets, said setting mechanism including means normally tending to cause its parts to assume a neutral relation to effect and maintain a disengaged relation between said actuators and their drivers, and means including a common locking element for holding said setting mechanism in its set position when operated to effect an engaging relation between said actuators and either of said sets of driving elements.

30. In a combined typewriting and computing machine, the combination with a computing head, of a plurality of actuating devices for said computing head, two sets of driving devices, means for actuating said driving devices, a universal bar engaging with said actuating devices, two keys to move the universal bar in opposite directions to connect the actuating devices with either set of driving devices, and means for locking said keys to retain said actuating devices connected.

31. In a computing machine, in combination, a set of computing wheels, operating mechanism therefor including two sets of drivers, said wheels being normally disconnected from the drivers of both of said sets, a state-setting mechanism for controlling the driving relations between said wheels and said drivers, said state-setting mechanism including mutually engaging parts normally effective as a lock to prevent accidental driving connections between said parts, manually operative means for selectively effecting a relative movement of said parts to automatically render said locking means ineffective and establish a driving relation between said wheels and either of said sets of drivers, means constantly tending to restore said parts to their normal relation, and a lock to hold said parts in set relation when operated to effect driving relations between said wheels and either set of drivers.

32. In a computing machine, in combination, a set of computing wheels, operating mechanism therefor including two sets of drivers, said wheels being normally disengaged from the drivers of both of said sets, a state-setting mechanism for controlling the driving relations between said wheels and said drivers, said state-setting mechanism including mutually engaging parts normally effective as a lock to prevent accidental driving connections between said parts, manually operative means for selectively effecting a relative movement of said parts to automatically render said locking means ineffective and establish a driving relation between said wheels and either of said sets of drivers, means constantly tending to restore said parts to their normal relation, a lock to hold said parts in set relation when operated to effect driving relations between said wheels and either set of drivers, and means controlled by said operating mechanism for automatically rendering said lock ineffective after a computing operation has been effected to permit said mechanism to restore the normally disengaged relation between said wheels and their drivers.

33. In a computing machine, in combination, a set of computing wheels, a set of controllers for determining their movements when operated, indexing devices for variably setting said controllers in accordance with the component elements of a computation, operating mechanism including driving means for effecting movements of said wheels in accordance with the settings of said indexing devices, state-setting mechanism to control the engaging relations between said driving means and said computing wheels, said setting mechanism including means constantly tending to cause its parts to assume a neutral relation to effect and maintain a disengaged relation between said wheels and their driving means, means for automatically locking said state-setting mechanism when set to effect engaging relations between said wheels and said driving means, means controlled by said operating mechanism for restoring the settings of said controller indexing devices after a computation has been effected, and means controlled by said restoring means for rendering said locking means ineffective so as to permit said state-setting mechanism to restore the normal disengaged relation between said computing wheels and their driving means.

34. In a computing machine, in combination, a plurality of totalizers each comprising a set of computing wheels, operating mechanism therefor including two sets of master-drivers and means for variably moving master-drivers of different sets in accordance with elements of computations of different character, the master-drivers of each of said sets being available in common as driving elements for corresponding wheels of a plurality of said totalizers, a state-setting mechanism for each totalizer for selectively establishing driving relations between its computing wheels and master-drivers of either of said sets, means normally tending to cause said state-setting mechanism to effect and maintain disengaged relations between said wheels and said master-drivers, means for locking each of said mechanisms in set relation when operated to effect driving relations between said wheels and master-drivers of either of said sets, and means actuated by said operating means for automatically rendering the locking means of all set state-setting mechanisms ineffective, so as to permit them to restore the normal disengaged relations between said computing wheels and said master-drivers.

35. In a computing machine, in combination, a set of computing wheels, a set of variably settable addition-controllers, a set of variably settable subtraction-controllers, means for setting said addition-controllers in accordance with the digits of a number, and for setting said subtraction-controllers in accordance with the complements of said digits on a basis of nine, operating mechanism including means for effecting a movement of the units subtraction-controller one unit's distance in addition to that corresponding to its setting, and for effecting movements of the other subtraction-controllers and of all the addition-controllers in accordance with their settings, and means for selectively causing said computing wheels to be operated in accordance with the movements of one or the other of said sets of controllers, depending upon whether it is desired to effect an addition or a subtraction of a number set up on said controllers.

36. In a computing machine, in combination, a set of computing wheels, a set of variably settable addition-controllers, a set of variably settable subtraction-controllers, means for simultaneously setting the controllers of both sets including means for setting addition-controllers in accordance with elements of a number as represented by its digits, and for setting corresponding subtraction-controllers in accordance with corresponding elements of an arithmetical complement of the same number, and means for selectively causing said computing wheels to be operated in accordance with the settings of one or the other of said sets of controllers, dependent upon whether it is desired to effect addition or subtraction of the number indexed.

37. In a computing machine, in combination, a set of computing wheels, a set of controllers to determine the extent of their movements when adding, a second set of controllers to determine the extent of their movements when substracting, a set of indexing pins for each controller, a set of number keys, means controlled by said keys for simultaneously setting pins of corresponding controllers of both sets, said pin-setting means including pairs of pin-setting bars, each pair controlled by a single key, one bar of a pair being effective when its key is operated to set a pin of a controller of one set determinative of a movement corresponding to the value of the number represented by said key, the other bar of the same pair being effective to concomitantly set a pin of a corresponding controller of the other set determinative of a movement corresponding to the value of the complement of the number represented by said key, and means for selectively causing said computing wheels to be operated in accordance with the indexing of one or the other of said sets of controllers, dependent upon whether it is desired to add or to subtract.

38. In a computing machine, in combination, a set of computing wheels, a plurality of sets of controllers for determining the extent of their movements when operated, indexing devices for said controllers, a set of number keys, means controlled by said keys for simultaneously setting indexes of corresponding controllers of the different sets in accordance with the component elements of computations of different character, and means for selectively causing said computing wheels to be operated in accordance with the index-settings of any one of said sets of controllers, depending upon the nature of the computation to be effected.

39. In a computing machine, in combination, a set of computing wheels and actuating mechanism therefor, including a set of controlling devices for determining the extent of their movements when operated, each controlling device of the set being variably settable to determine movements of different magnitude, and all of the controlling devices of said set being normally set to determine movements of maximum magnitude.

40. In a computing machine, in combination, a set of computing wheels and actuating mechanism therefor, including a set of controllers for determining the extent of their movements when operated, said controllers being variably settable in accordance with elements of an arithmetical complement of a number to be subtracted, and each being normally set to determine a movement proportional in extent to an element of said complement corresponding to a zero of said number as represented by its digits.

41. In a computing machine, in combination, a set of computing wheels and actuating mechanism therefor, including a set of controllers for determining the extent of their movements when operated, a set of indexing devices for each controller of the set by means of which it may be variably set to determine movements of varying extent, the indexing device of each controller for determining a movement of maximum extent being normally set to be effective, and means for rendering said normally set indexing device of any controller ineffective on setting any other indexing device of the same controller.

42. In a computing machine, in combination, a set of computing wheels and actuating mechanism therefor, including a set of controllers for determining the extent of their movements when operated, a set of indexing devices for each controller of the set by means of which it may be variably set to determine movements of varying extent, the indexing device of each controller for determining a movement of maximum extent being normally set to be effective, means for rendering said normally set indexing device of any controller ineffective on setting any other indexing device of the same controller, and means for simultaneously restoring all of said indexing devices to their normal positions after a computing operation has been effected.

43. In a computing machine, in combination, one or more sets of computing wheels and actuating mechanism therefor, including two sets of variably settable controllers, one for determining movements of wheels of any of said sets when adding, and the other for determining movements of wheels of any of said sets when subtracting, means for setting controllers of one set to determine movements corresponding with elements of a number as represented by its digits, and for simultaneously setting corresponding controllers of the other set to determine movements corresponding with corresponding elements of an arithmetical complement of the same number, the last-mentioned set including controllers normally set to determine maximum movements corresponding to complements of zeros, and means for rendering the normal settings of any controller of the last-mentioned set ineffective on setting the same controller to determine a movement of different extent.

44. In a computing machine, in combination, one or more sets of computing wheels and actuating mechanism therefor, including a set of controllers for determining movements of computing wheels of one of said sets when adding, a second set of controllers for determining movements of computing wheels of one of said sets when subtracting, a set of indexing devices for each controller for variably setting its movement-determining effect, said indexing devices of each set of controllers being arranged in transverse rows, the rows of one set being staggered relatively to those of the other, a set of number keys, means controlled by said keys for priming corresponding controllers of both sets in preparation for the setting of indexing devices thereof, and means controlled by said keys for simultaneously setting indexing devices of corresponding primed controllers of both sets, said setting means including pairs of setting bars, each pair being controlled by a single key, one bar of a pair being in coöperative alinement with the transverse row of indexing devices of one set of controllers, and the other bar of the same pair being in alinement with a transverse row of complemental indexing devices of the other set.

45. In a computing machine, in combination, one or more sets of computing wheels and actuating mechanism therefor, including two sets of variably settable controllers, one set for determining movements of wheels of any of said sets when adding, and the other set for determining movements of wheels of any of said sets when subtracting, a set of number keys, means controlled by each key for setting a controller of one set in accordance with the number represented by said key, and for simultaneously setting a corresponding controller of the other set in accordance with a complement of said number, the controllers of said second-mentioned set being normally set to determine movements corresponding to complements of zeros, and means controlled by each of said keys for rendering said normal controller-settings ineffective.

46. In a computing machine, in combination, a set of computing wheels, operating mechanism therefor, said wheels and said operating mechanism being normally in disengaged relation, a state-setting mechanism for controlling the driving relations between said wheels and said operating mechanism, means for manually operating said setting mechanism to effect driving relations between said wheels and said operating mechanism, means constantly tending to restore said parts to their normal relation, means for automatically locking said parts to maintain a setting during a computing operation, means actuated by said operating mechanism for automatically rendering said automatic locking means ineffective after a computing operation has been effected to permit said mechanism to restore the normal disengaged relation between said wheels and said operating mechanism, and a second locking means for locking said setting mechanism in its set relation, and maintaining the setting after the automatic locking means has been rendered ineffective.

47. In a computing machine, in combination, a set of computing wheels, operating mechanism therefor including two sets of drivers, said wheels being normally disconnected from the drivers of both of said sets, a state-setting mechanism for controlling the driving relations between said wheels and said drivers, manually operative means for selectively effecting a relative movement of said parts to establish driving relations between said wheels and drivers of either of said sets, means constantly tending to restore said parts to their normal relation, means for automatically locking said parts in set relation when operated to effect driving relations between said wheels and drivers of either set, operating mechanism for said machine, including means for automatically rendering said automatic locking means ineffective after a computing operation has been effected, to permit said mechanism to restore the normal disconnected relation between said wheels and said drivers, and a second locking means for maintaining the state-setting mechanism in its set relation indefinitely when it is desired to retain the set driving relations between the wheels and their drivers, to effect a succession of computations of like character.

48. In a computing machine, in combination, a totalizer comprising a set of computing wheels, actuating mechanism therefor including two sets of drivers, means for variably moving the drivers of different sets in accordance with elements of computations of different character, state-setting mechanism for controlling the driving relations between said computing wheels and said drivers, said state-setting mechanism including parts settable in a neutral relation to effect and maintain a disconnected relation between said computing wheels and their drivers, and in either of two computation-controlling relations to effect driving connections to said wheels from one or the other of said sets of drivers, and means controlled by a single finger-piece for locking said setting mechanism in any one of its three setting positions.

49. In a combined typewriting and computing machine, the combination with a typewriter including a traveling carriage, and means including number keys to control its movements in letter-spacing direction, of a computing machine including one or more sets of computing wheels, operating mechanism therefor comprising a plurality of sets of variably settable controllers for variably determining computing-wheel-movements, each set including individual controllers representing different denominational orders, a single set of jacks including a separate jack for each denominational order, a tappet for operating said jacks in succession as said carriage is advanced through a computing zone determined by the relative position of said tappet with respect to said set of jacks, means controlled by said jacks when operated for selecting and priming corresponding controllers of different sets, means controlled by said keys as the carriage is advanced through said zone, for setting corresponding controllers of both sets as primed, and means for selectively effecting driving connections for causing the computing wheels of one or more of said sets to be operated in accordance with the settings of one or the other of said sets of controllers.

50. In a combined typewriting and computing machine, the combination with a typewriter including a traveling carriage, and means including number keys to control its movements in letter-spacing direction, of a computing machine including one or more sets of computing wheels, operating mechanism therefor including two sets of variably settable controllers, one set for determining movements of computing wheels when adding, and the other set for determining movements of computing wheels when subtracting, each set including individual controllers representing different denominational orders, indexing devices for variably setting said controllers, a single set of jacks including a separate jack for each denominational order, a tappet for operating said jacks in succession as said carriage is advanced through a computing zone determined by the relative position of said tappet with respect to said set of jacks, means controlled by each jack, when operated, for selecting and simultaneously priming a corresponding controller of each set, so that its indexing device may be set, means controlled by said keys, as the carriage is advanced through said zone, for setting corresponding controllers of both sets as selected and primed, and means for selectively effecting driving connections for causing computing wheels of one or more of said sets to be controlled in accordance with the settings of one or the other of said sets of controllers.

51. In a combined typewriting and computing machine, the combination with a typewriter including a carriage movable for letter-spacing, of a computing machine comprising a totalizer, operating mechanism therefor, including two sets of variably settable controllers, each set comprising individual controllers representing different denominational orders, denomination-selecting means controlled by the letter-spacing movements of said carriage for determining when controllers of said sets may be set so as to be effective, means for effecting complemental settings of controllers of corresponding denomination as selected, and state-setting means for selectively causing said totalizer to be operated in accordance with the settings of controllers of either of said sets at will.

52. In a combined typewriting and computing machine, the combination with a typewriter including a carriage movable for letter-spacing, of a computing machine comprising a plurality of totalizers, operating mechanism therefor including two sets of variably settable controllers, each set including individual controllers representing different denominational orders, denomination-selecting means controlled by the letter-spacing movements of said carriage for determining when controllers of said sets may be set so as to be effective, means for effecting complemental settings of controllers of corresponding denomination as selected, and state-setting means for selectively causing any of said totalizers to be operated in accordance with the settings of controllers of either of said sets and for causing any of the remaining totalizers, if any, to be concomitantly operated in accordance with the settings of controllers of the other of said sets.

53. In a computing machine, in combination, one or more totalizers, each comprising a set of computing wheels, a set of variably settable controllers to determine computing-wheel-movements to effect an addition of a number, a second set of variably settable controllers to determine complemental computing-wheel-movements to effect a subtraction of said number, and operating mechanism including means for selectively causing computing wheels of any of said totalizers to be moved in accordance with the settings of controllers of either of said sets, and for causing computing wheels of any of the remaining totalizers, if any, to be moved in accordance with the settings of controllers of the other of said sets.

54. In a combined typewriting and computing machine, the combination with a typewriter including a traveling carriage and means, including a set of number keys, for controlling its movements in letter-spacing direction, of a computing machine comprising one or more totalizers, operating mechanism therefor including two sets of variably settable controllers, each set including individual controllers for different denominational orders, means controlled by the movement of said carriage in letter-spacing direction for selecting and priming controllers of corresponding denomination in each of said sets, means controlled by said keys for simultaneously setting corresponding controllers as selected and primed, and means for selectively causing any of said totalizers to be operated in accordance with the settings of controllers of either of said sets, and for causing any of the remaining totalizers, if any, to be concomitantly operated in accordance with the settings of controllers of the other set.

55. In a combined typewriting and computing machine, the combination with a typewriter including a traveling carriage and means including number keys for controlling its movements in letter-spacing direction, of a computing machine comprising one or more totalizers, a group of addition-indexing devices including a plurality of sets, each representing a different denominational order, a group of subtraction-indexing devices including a like number of sets representing corresponding denominational orders, a single set of denomination-selecting devices controlled by the letter-spacing movements of said carriage for simultaneously selecting and priming sets of indexing devices of corresponding denomination in each of said groups, means controlled by said keys for simultaneously setting indexing devices of corresponding primed sets as selected, and means for causing any of said totalizers to be operated in accordance with the settings of indexing devices of either of said groups, and for causing any of the remaining totalizers, if any, to be operated in accordance with the settings of indexing devices of the other group.

56. In a combined typewriting and computing machine, the combination with a typewriter including a traveling carriage and means including number keys for controlling its movements in letter-spacing direction, of a computing machine comprising one or more totalizers, a group of addition-indexing devices including a plurality of sets, each representing a different denominational order, a group of subtraction-indexing devices including a like number of sets representing corresponding denominational orders, a single set of denomination-selecting devices controlled by the letter-spacing movements of said carriage for simultaneously selecting and priming sets of indexing devices of corresponding denomination in each of said groups, means controlled by said keys for simultaneously setting indexing devices of corresponding primed sets as selected, and means for causing any of said totalizers to be operated in accordance with the settings of indexing devices of either of said groups, and for causing any of the remaining totalizers, if any, to be operated in accordance with the settings of indexing devices of the other group, said totalizer or totalizers being normally disconnected from said operating means.

57. In a computing machine, in combination, one or more totalizers, each comprising a set of computing wheels, a set of devices for determining computing-wheel-movements to effect an addition of a number, a second set of devices for determining computing-wheel-movements of different extent, but in the same direction to effect a subtraction of the same number, and means for causing wheels of any of said totalizers to be operated under the control of movement-determining devices of either of said sets, and for causing wheels of any of the remaining totalizers, if any, to be simultaneously operated under the control of movement-determining devices of the other set.

58. In a computing machine, in combination, a totalizer comprising a set of computing wheels, a set of actuating racks therefor, each rack having individual driving connection with one of said computing wheels, a second set of racks, each rack of the second-mentioned set having an operative connection with the corresponding rack of the first-mentioned set, a set of drivers, one driver for each pair of operatively connected racks, means for effecting movements of said drivers in accordance with the component elements of a number as represented by its digits, and setting mechanism including means for moving racks of the second-mentioned set into driving engagement with the corresponding drivers to effect a driving relation between each of said drivers and the corresponding computing wheel.

59. In a computing machine, in combination, a totalizer comprising a set of computing wheels, a set of actuating racks therefor, each rack having individual driving engagement with one of said computing wheels, a second set of racks, each rack of the second set having operative connection with the corresponding rack of the first-mentioned set, a set of drivers, one driver for each pair of operatively connected racks, and a setting mechanism including means for moving the racks of the second-mentioned set into driving engagement with the corresponding drivers, to effect a driving relation between each of said drivers and the corresponding computing wheel, and to maintain such driving relation until the completion of the driving action of said drivers.

BURNHAM C. STICKNEY.

Witnesses:
CATHERINE A. NEWELL,
E. B. LIBBEY.